US008251085B2

(12) United States Patent
Goodson

(10) Patent No.: US 8,251,085 B2
(45) Date of Patent: Aug. 28, 2012

(54) LEAK PREVENTION METHOD FOR GAS LINES

(76) Inventor: Mark E. Goodson, Corinth, TX (US)

( * ) Notice: Subject to any disclaimer, the term of this patent is extended or adjusted under 35 U.S.C. 154(b) by 605 days.

(21) Appl. No.: 12/534,455

(22) Filed: Aug. 3, 2009

(65) Prior Publication Data

US 2011/0024655 A1 Feb. 3, 2011

(51) Int. Cl.
*F16K 31/02* (2006.01)

(52) U.S. Cl. ........... 137/78.4; 137/554; 251/65; 251/68; 251/129.04

(58) Field of Classification Search ................. 137/78.1, 137/78.4, 554; 251/65, 66, 68, 69, 70, 71, 251/129.01, 129.04; 174/78; 361/107, 111, 361/113, 117, 118, 133, 170
See application file for complete search history.

(56) References Cited

U.S. PATENT DOCUMENTS

| | | | | | |
|---|---|---|---|---|---|
| 2,723,367 | A | * | 11/1955 | Bockman | 251/129.04 |
| 2,729,221 | A | * | 1/1956 | Gorham et al. | 137/78.4 |
| 2,850,257 | A | * | 9/1958 | Smith et al. | 251/66 |
| 4,098,284 | A | * | 7/1978 | Yamada | 251/68 |
| RE30,135 | E | * | 11/1979 | Fitzwater et al. | 251/68 |
| 5,158,447 | A | * | 10/1992 | Geary | 251/129.01 |
| 5,293,551 | A | * | 3/1994 | Perkins et al. | 251/129.01 |
| 6,061,216 | A | * | 5/2000 | Fuqua, III | 361/117 |
| 6,199,573 | B1 | * | 3/2001 | Paskiewicz | 137/78.4 |
| 6,268,988 | B1 | * | 7/2001 | Baker | 361/42 |
| 6,351,366 | B1 | * | 2/2002 | Alexanian et al. | 251/129.04 |
| 6,463,950 | B1 | * | 10/2002 | Staniczek | 251/129.04 |
| 7,044,167 | B2 | * | 5/2006 | Rivest | 138/121 |
| 7,367,361 | B2 | * | 5/2008 | Steingass | 137/893 |
| 7,458,387 | B2 | * | 12/2008 | McGill | 251/68 |
| 7,562,448 | B2 | * | 7/2009 | Goodson | 174/78 |
| 7,821,763 | B2 | * | 10/2010 | Goodson | 361/215 |
| 2007/0012472 | A1 | * | 1/2007 | Goodson | 174/127 |

* cited by examiner

*Primary Examiner* — Eric Keasel
(74) *Attorney, Agent, or Firm* — David W. Carstens; Jeffrey G. Degenfelder; Carstens & Cahoon, LLP

(57) ABSTRACT

The present invention provides failsafe system for cutting gas off gas flow in response to electrical insults that may damage gas tubing. The invention uses an inductive sensor to detect electrical surges along a ground conductor that provides a ground path for gas tubing. The sensor is coupled to control circuitry that provides a continuous pulse train to a solenoid that forms part of a valve that controls gas flow through the gas tubing. The pulse train from the control circuitry keeps the valve open. In response to an electrical surge detected along the ground conductor (e.g., from lightning), the control circuitry stops the pulse train to the solenoid, which in turn causes the gas valve to close and stop the gas flow through the tubing.

17 Claims, 7 Drawing Sheets

LEAK PREVENTION METHOD FOR GAS LINES

TECHNICAL FIELD

The present invention relates generally to the prevention of fires caused by lightning and more specifically to fires involving gas leaks in Corrugated Stainless Steel Tubing and similar gas lines (sometimes referred to as appliance connectors).

BACKGROUND OF THE INVENTION

Corrugated Stainless Steel Tubing (CSST) is a relatively new building product used to plumb structures for fuel gas in lieu of conventional black pipe. The advantages that are offered for CSST include a lack of connection and a lack of threading. In essence, it is a material that results in substantial labor savings relative to using black pipe.

The use of Corrugated Stainless Steel Tubing (CSST) to serve as a conduit for delivering fuel gas within residential and commercial buildings has been recognized by the National Fuel Gas Code (NFPA 54) since about 1988. Various code bodies and regulatory agencies have allowed the use of CSST in such structures.

CSST differs from black pipe in a number of ways. In a CSST system, gas enters a house at a pressure of about 2 psi and is dropped to ~7" WC by a regulator in the attic (assuming a natural gas system). The gas then enters a manifold and is distributed to each separate appliance via "home runs." Unlike black pipe, a CSST system requires a separate run for each appliance. For example, a large furnace and two water heaters in a utility closet will require three separate CSST runs. With black pipe, the plumber may use only one run of 1" pipe and then tee off in the utility room. Therefore, the requirement of one home run per appliance significantly increases the number of feet of piping in a building.

CSST is sold in spools of hundreds of feet and is cut to length in the field for each run. In this regard, CSST has no splices or joints behind walls that might fail. CSST also offers an advantage over black pipe in terms of structural shift. With black pipe systems, the accommodations for vibrations and/or structural shifts are handled by appliance connectors, a form of flexible piping.

Unfortunately, a major drawback to the use of CSST is the propensity for it to fail when exposed to an electrical insult such as from a lightning strike to an adjacent structure. CSST is very thin, with walls typically about 10 mils in thickness. The desire for easy routing of the tubing necessitates this lack of mass. However, it also results in a material through which electricity can easily puncture.

When subjected to significant electrical insult such as a lightning strike, CSST typically develops holes which act as orifices for raw fuel gas leakage. Even worse, the electrical arcing process which causes the insult and resultant gas leak from the CSST will often ignite the gas, effectively turning the gas leak into a blowtorch. This phenomenon is described by the inventor's two papers on the subject, "CSST and Lightning," Proceedings, *Fire and Materials* 2005 *Conference*, January 2005, and "The Link Between Lightning, CSST, and Fires," *Fire and Arson Investigator*, October 2005, the contents of which are hereby incorporated by reference.

Lightning strikes vary in current from 1,000 (low end) to 10,000 (typical) to 200,000 (maximum) amperes peak. Mechanical damage caused by heating is a function of the current squared multiplied by time. Thus, the current is the dominant factor creating the melting of gas tubing.

One of the underlying issues with CSST is that it is part of the electrical grounding system. For reasons of electric shock prevention (and also elimination of sparks associated with static electricity), it is desirable to have all exposed metal within a structure bonded so that there are no differences of potential. However, there are limitations to applying DC circuit theory (or even 60 Hz steady state phasor theory) in this situation because lightning is known to have fast wavefronts. While the reaction of large wires and irregular surfaces is predictable at 60 Hz, the fast wave fronts associated with lightning may cause substantial problems with CSST, given its corrugated surface. Moreover, new house construction has shown very tight bends and routing of CSST immediately adjacent to large ground surfaces, creating the potential for arcs created by lightning strikes. Testing of CSST under actual installed conditions using transient waveforms may well show further limitations that conventional bonding and grounding cannot accommodate.

The typical gas line or gas system, whether black pipe or CSST, is usually not a good ground. The metal components that make up a gas train are made from materials that are chosen for their ability to safely carry natural gas (or propane) and the accompanying odorant. These metallic components are not known for their ability to carry electric current. To further compound matters, it is not uncommon to find pipe joints treated with Teflon tape or plumber's putty, neither of which is considered an electrical conductor. The Fuel Gas Code (NFPA 54) calls for above ground gas piping systems to be electrically continuous and bonded to the grounding system. The code provision also prohibits the use of gas piping as the grounding conductor or electrode.

Gas appliance connectors (GAC), which are prefabricated corrugated gas pipes, are also known to fail from electric current, whether this current is from lightning or from fault currents seeking a ground return path. These connectors usually fail by melting at their ends (flares) during times of electrical overstress. These appliance connectors are better described ANSI Z21.24, *Connectors for Indoor Gas Appliances*, the contents of which are hereby incorporated by reference. A gas appliance that is not properly grounded is more susceptible to gas line arcing than a properly grounded appliance. The exact amount of fault current, however, will depend upon the impedances of the several ground paths and the total fault current that is available. For example, air handlers for old gas furnaces seem to be the most prone. Typically, an inspection will reveal that the power for the blower motor uses a two-conductor (i.e. non-grounded) power cord.

A primary indicator that is found in these types of fires is the focal melting of the gas line at the brass nut/connector. It is well known and appreciated that the flame that is fueled from a gas orifice does not normally make physical contact with the orifice itself. Rather, there is some distance between the flame and orifice depending on the gas pressure, the size of the orifice, available oxygen, and the mixing or turbulence. In short, the leaking gas is too rich to bum at the point of escape. In addition, gas that is under pressure will cause a very small amount of cooling to occur when the gas escapes from such a leak or orifice due to adiabatic cooling. Both of these factors indicate that a gas line would be least likely to melt at a connection if the melting were indeed caused by the heat from a flame, as opposed to electrical insult.

Therefore, it would be desirable to have a gas conduit system incorporating CSST or GAC that is capable of preventing fires caused by auto-ignition of gas leaks resulting from electrical insult to the gas tubing.

SUMMARY OF THE INVENTION

The present invention provides failsafe system for cutting gas off gas flow in response to electrical insults that may damage gas tubing. The invention uses an inductive sensor to detect electrical surges along a ground conductor that provides a ground path for gas tubing. The sensor is coupled to control circuitry that provides a continuous pulse train to a solenoid that forms part of a valve that controls gas flow through the gas tubing. The pulse train from the control circuitry keeps the valve open. In response to an electrical surge detected along the ground conductor (e.g., from lightning), the control circuitry stops the pulse train to the solenoid, which in turn causes the gas valve to close and stop the gas flow through the tubing.

If the intensity of a lightning strike is strong enough to destroy semiconductor junctions in the circuitry, the circuitry will cease to function properly, thereby failing in a safe manner and removing current to the solenoid. This will cause the gas valve to close, thereby avoid gas leakage through any perforations in the CSST that may have resulted from the electrical insult.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION

FIGS. 1-4 illustrate common scenarios for electrically induced gas fires involving Corrugated Stainless Steel Tubing (CSST).

Figure 1:
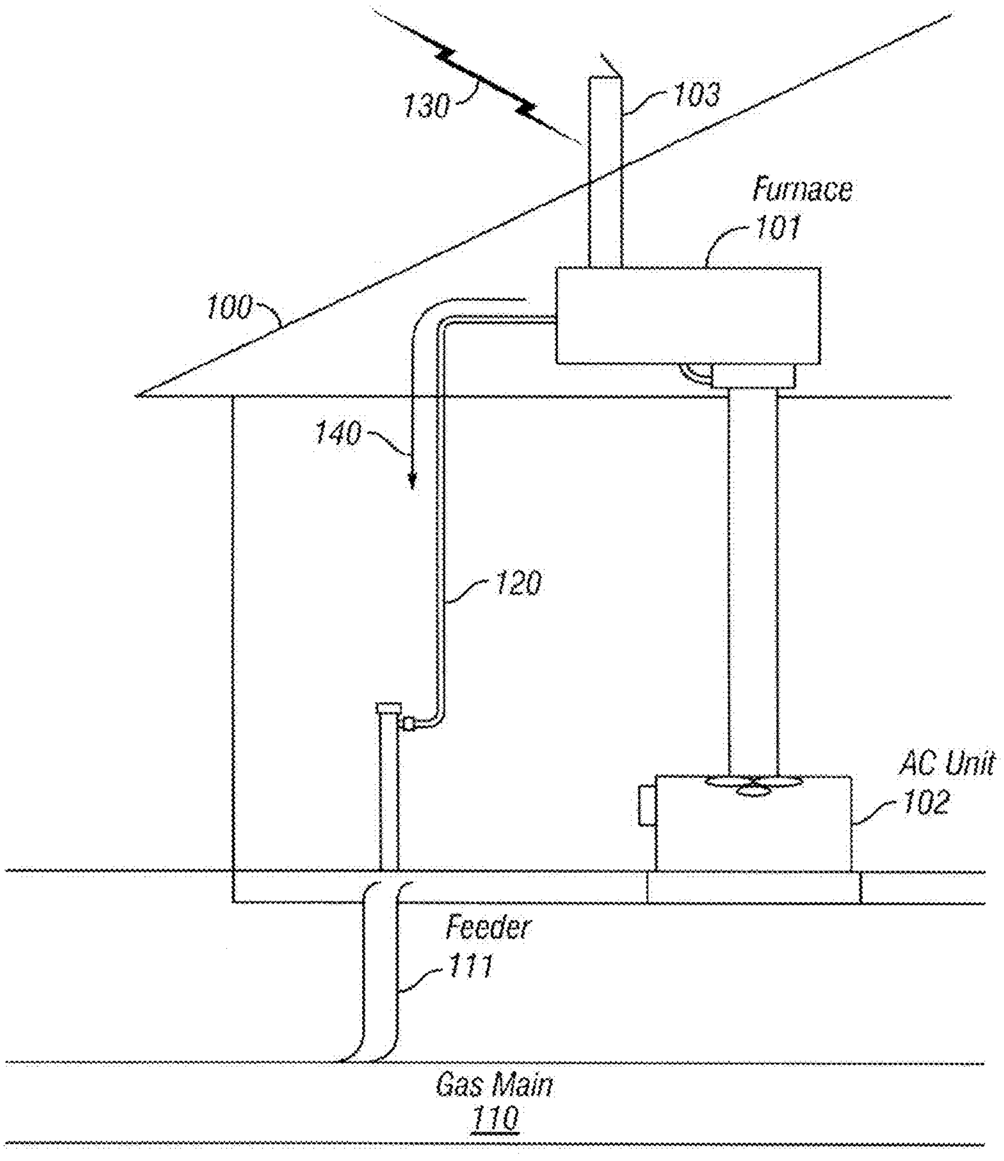
FIG. 1 shows a partial cross section a house illustrating the mechanical connection between the gas line, furnace and air conditioning system.

FIG. 1 shows a partial cross section a house illustrating the mechanical connection between the gas line, furnace and air conditioning system. In this example, the furnace 101 is located in the attic of the house 100. The air conditioning unit 102 is located at ground level. Gas from the gas main 110 enters the house 100 through a feeder line 111. A CSST line 120 connects the feeder 111 to the furnace 101.

The metal chimney 102 of the furnace 101 extends through the roof. If this chimney 103 is struck by lightning 130, the charge will often go to ground through the CSST line 120 as indicated by arrow 140.

Figure 2:
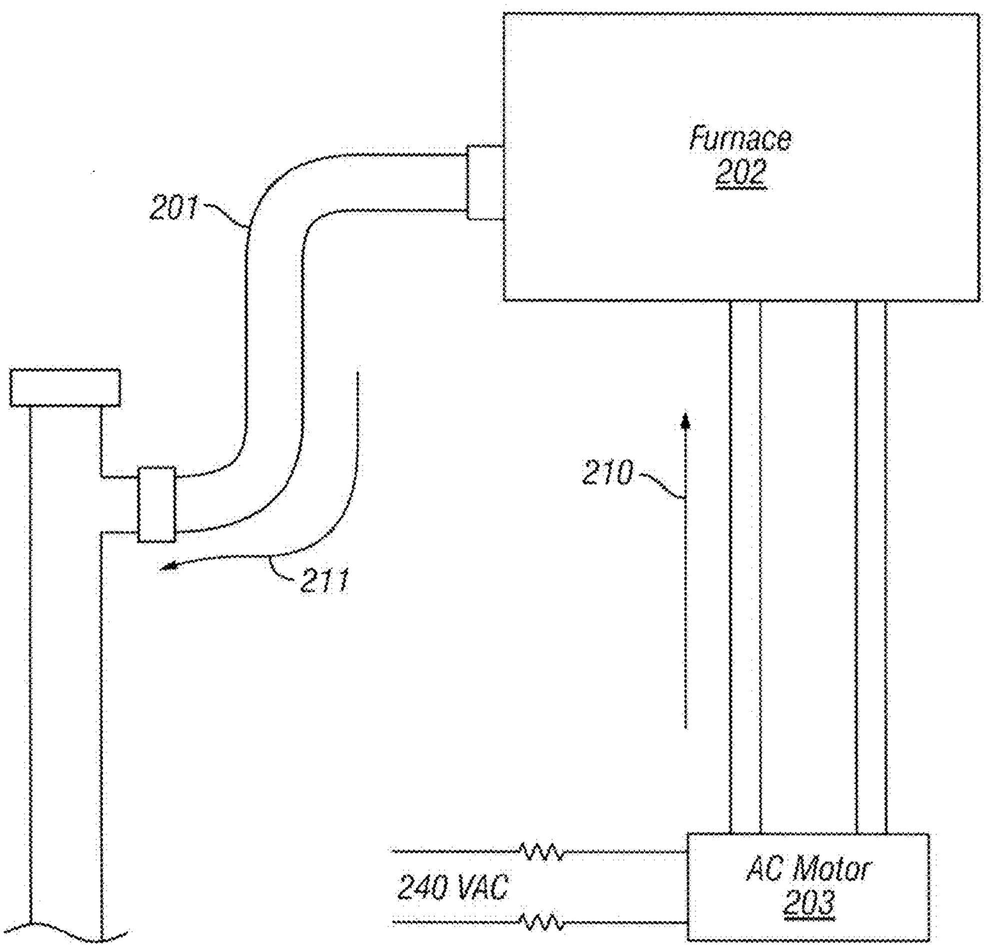
FIG. 2 illustrates another scenario for a CSST or gas appliance connector related gas fire in which the fire is induced by an electrical short from an appliance.

FIG. 2 illustrates another scenario for a CSST or gas appliance connector related gas fire in which the fire is induced by an electrical short from an appliance. FIG. 2 shows an arrangement similar to that in FIG. 1 involving a CSST line 201, a furnace 202 and an A/C unit 203. If the A/C motor 203 becomes stuck the windings in it burn out and short to ground though their physical connection to the furnace 202 and CSST line 201 as indicated by arrows 210, 211.

Figure 3:
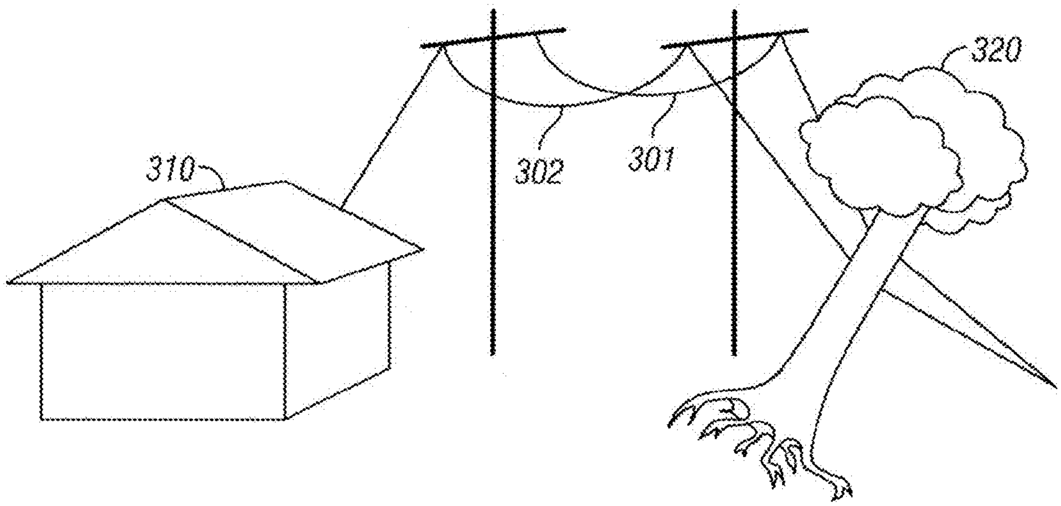
FIG. 3 shows yet another situation in which electrical grounding can damage CSST lines.

FIG. 3 shows yet another situation in which electrical grounding can damage CSST lines. In this example, a tree 320 has fallen across two power lines 301, 302 connected to a house 310. The tree 320 causes the high volt line 301 and the ground line 302 to touch together. In this situation the ground line 302 becomes energized and spills current through the entire house 310, which can result in the electrical current grounding through CSST lines as illustrated in FIGS. 1 and 2.

Figure 4:
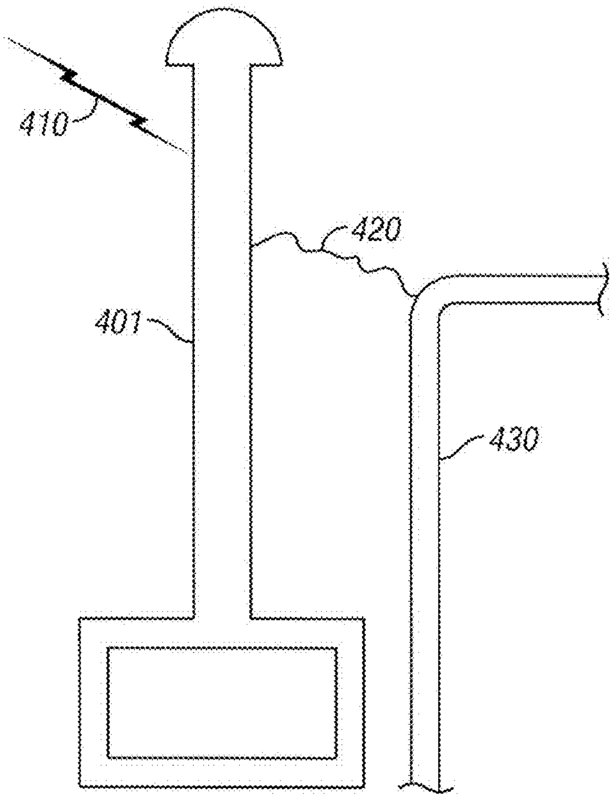
FIG. 4 depicts an example of a CSST perforation caused by electrical arcing.

FIG. 4 depicts an example of a CSST perforation caused by electrical arcing. In this case, the CSST 430 runs parallel to a metal chimney 401 but is not in direct physical contact with the chimney. If the chimney 401 is struck by lightning 410, the potential difference created by the lightning strike might be large enough to produce an electrical arc 420 between the chimney and the CSST 430. Such electrical arcing is most likely to produce perforation along the length of the CSST.

Figure 5:
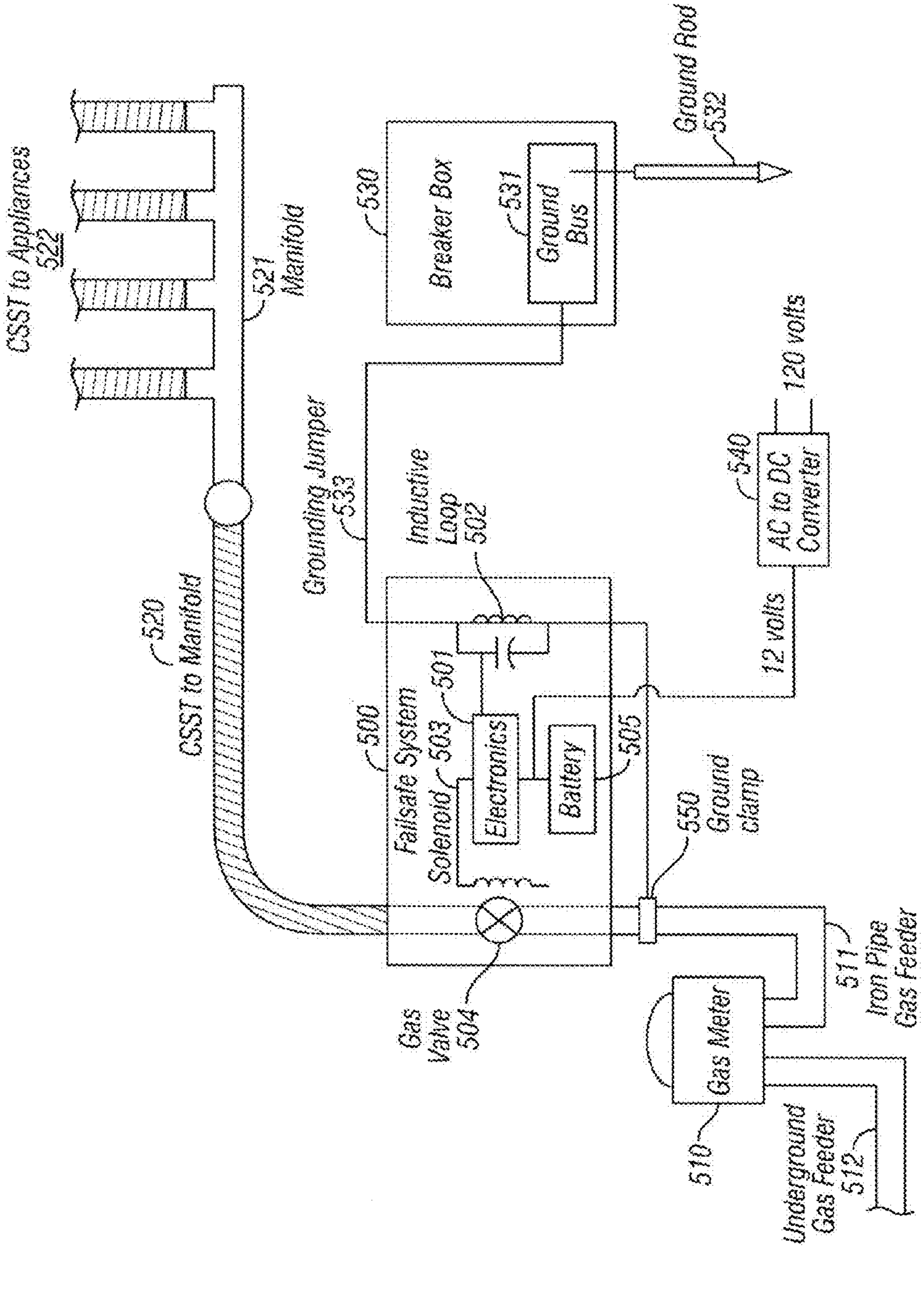
FIG. 5 shows an electrical failsafe system in accordance with a preferred embodiment of the present invention.

FIG. 5 shows an electrical failsafe system in accordance with a preferred embodiment of the present invention. The failsafe system 500 of the present invention is positioned between the gas feeder line 511 and the CSST 520 that is coupled to the manifold 521 that distributes gas to appliances through additional CSST lines 522.

CSST is installed such that it is electrically referenced to ground, either by a grounding jumper attached at the gas manifold or to the incoming gas line to the building. In the present example, the grounding jumper 533 is coupled via ground clamp 550 to the incoming gas line 511 that feeds gas from the underground feeder 512. The grounding jumper 533 is coupled to a ground bus 531 that provides the ground path for the breaker box 530 through ground rod 532. Should lightning strike the CSST piping 520, 522, either directly or indirectly through arcing from an adjacent structure, a portion of the charge will be diverted to the grounding jumper 533.

The present invention uses a tuned circuit that is inductively coupled to the ground conductor 533 by way of an inductive loop 502. The loop is encased in an insulating resin so as to both weatherproof it and to serve as an electrical isolator. The inductive loop then is shunted by transient protection, to include a Metal Oxide Varistor (MOV) (not shown).

The output of the loop is fed to control circuitry 501 than includes a tuned amplifier that is centered at about 300 KHz. When lightning currents flow down the ground path, the inductive loop 502 senses the current, and the resultant signal is amplified by the amplifier. The output of the control circuitry 501 is used to control the flow of a gas valve 504 that has an electrical solenoid 503 as its actuating means. In use, the solenoid 503 is held open by continuous electrical current supplied by the control circuitry 501. In response to a lightning pulse, the current is removed and the magnetic field from the solenoid 503 ceases to exist, thereby causing the gas valve 504 to close and shut off the gas flow through the CSST.

The electrical current for the control circuitry and solenoid are derived from a 120 VAC stepdown transformer 540 with DC rectification and filtering. This power supply also keeps a backup battery 505 charged, such that the control circuitry 501 and gas valve 504 can still function in the event of a power outage.

In an alternate embodiment of the invention, multiple sensors can be used instead of a single tuned circuit like the one shown in FIG. 5. The use of multiple sensors provides backup capabilities especially in the case of lightning strikes, which are devastating in the degree of electrical insult they produce.

Additionally, if the intensity of a lightning strike is strong enough to destroy semiconductor junctions in the circuitry, the circuitry will cease to function properly, thereby failing in a safe manner and removing current to the solenoid. This will cause the gas valve to close, thereby avoid gas leakage through any perforations in the CSST that may have resulted from the electrical insult.

Figure 6:
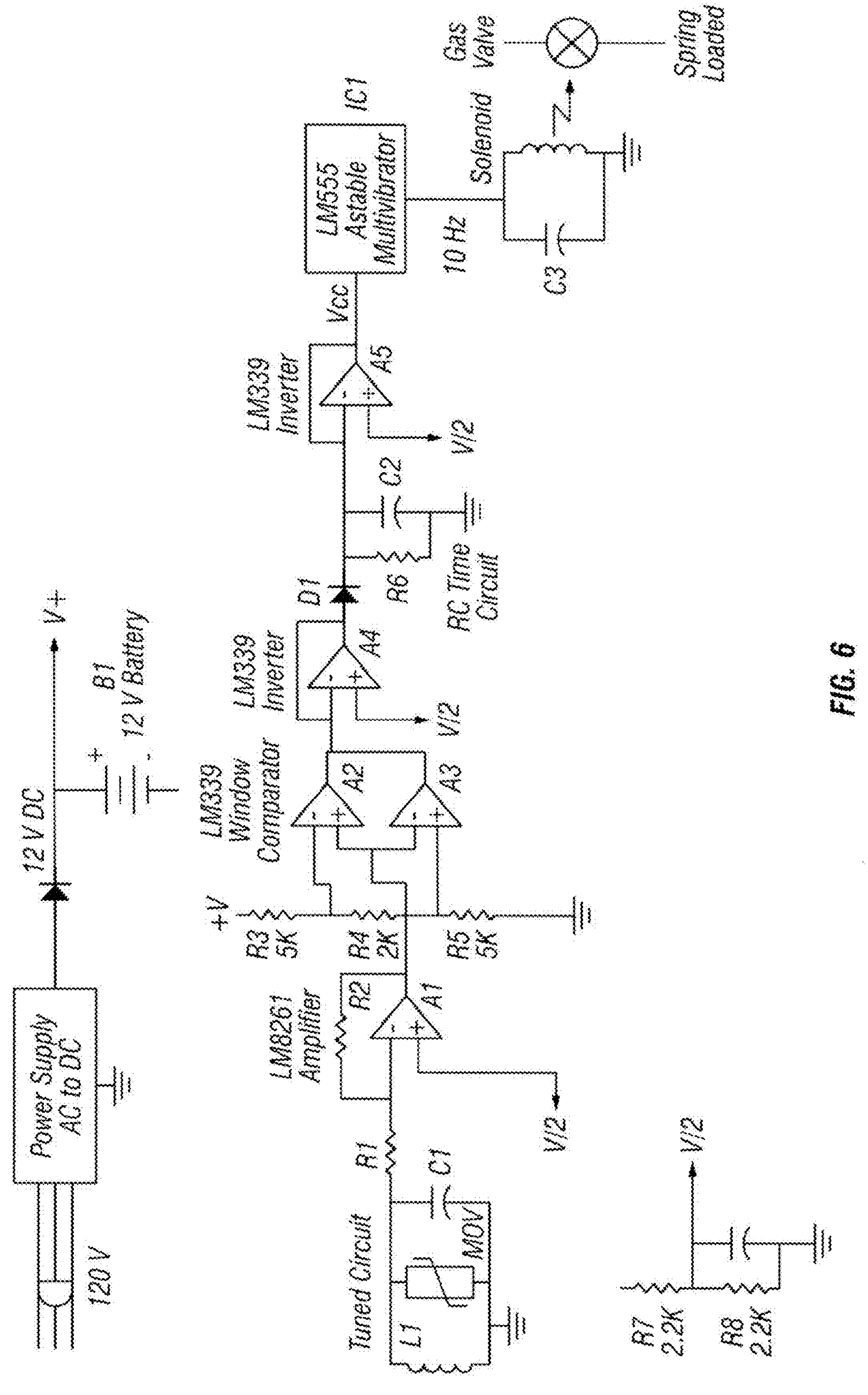
FIG. 6 is a detailed circuit diagram of the electrical failsafe system in accordance with the present invention.

FIG. 6 is a detailed circuit diagram of the electrical failsafe system 500 in accordance with the present invention. Referring to the left side of the diagram, L1 and C1 form a tuned circuit that is at resonance at approximately 300 KHz. L1 is an inductive loop that is placed around the ground conductor in a house, preferably the conductor that is used to bond the gas manifold for the CSST to the electrical system. The MOV (Metal Oxide Varistor) is used to protect the input of the amplifier A1 from high voltage transients.

A1 is a fast operational amplifier such as, e.g., a LM8261 or LM318 produced by National Semiconductor. Resistors R1 and R2 are chosen to give amplifier a gain of −10. The amplifier A1 output is coupled to a window comparator consisting of resistors R3, R4, and R5, as well as amplifiers A2 and A3. The values of R3 and R5 are set at about 5 K ohms, and the value of R4 is set at about 2 K ohms. In the preferred embodiment the integrated circuits (IC) for amplifiers A2, A3, A4 and A5 are LM 339s.

Under normal electrical conditions (i.e. when no lightning is detected) the output of A1 is about Vcc/2 (half positive supply voltage), or 6 volts, and the window comparator is set to have a window of about 5 to 7 volts. When the 6 volt signal from the A1 is fed to the window comparator, the output of the window comparator is Vcc, or 12 volts.

When lightning sends a pulse down the ground line, the pulse has a fast wave front that is sensed by the inductor/tuned circuit. This drives the amplifier A1 to either zero volts (ground) or 12 volts (Vcc), depending upon the polarity of the pulse.

The window comparator has an output signal that approaches either zero volts/negative rail (low) or 12 volts/positive rail (high). A 12 volt or zero volt signal from amplifier A1 to the window comparator causes the window comparator to have a low signal on its output. The timing of this low signal output will usually be a several-microsecond wide pulse, typically 3-4 μs.

The pulse from the window comparator is inverted by A4 and is fed to a resistor-capacitor (RC) time constant circuit comprising R6 and C2. In a preferred embodiment, this RC circuit is set at about one second. When powered by the window comparator output, the RC circuit (R6, C2) is driven to about 12 volts (Vcc), and then slowly discharges. The diode D1 insures that the low impedance output of the window comparator (A2, A3) does not affect the discharge rate of the time constant circuit R6, C2.

The inverted pulse (now stretched by the RC network) is then inverted again by inverter A5. The second inverter A5 is set at about Vcc/2, or 6 volts. Under normal conditions (no lightning), inverter A5 has a high output signal approaching 12 volts that provides power to IC1, which in the preferred embodiment is a National Semiconductor LM555 multivibrator timer set to operate in an a stable mode at 10 Hz.

A continuous pulse train from the multivibrator maintains a charge on capacitor C3, which is in parallel with a solenoid that forms part of the gas valve. The RC circuit formed by the impedance of the solenoid and the capacitor C3 keep the solenoid closed, which maintains the gas valve in an open, continuous flow mode.

When lightning is detected, the several-microsecond pulse width of the low signal from the window comparator is stretched by the RC time constant circuit (R6, C2) to about 1 second, thereby removing power to the IC1 mulitvibrator. The loss of power to IC1 stops the pulse train to C3 and the solenoid. Without the pulse train from the multivibrator, energy stored in the capacitor C3 is quickly dissipated, and the solenoid voltage drops (decays), allowing a spring within the solenoid to overcome the depleting magnetic forces and shut the gas valve. The gas valve must then be manually reset before gas flow can resume.

Referring to the top of the FIG. 5, a battery B1 is used to maintain gas flow within the system in the event of a power outage. A power supply module converts nominal house voltage (120 V 60~) to 12 volt nominal DC. The AC to DC converter (power supply) isolates the action of the gas valve by virtue of the insulation/isolation of the converter. In a preferred embodiment, the power supply is kept in a separate housing (such as plugs in a wall). This is done to try and keep the circuitry isolated from voltage spikes that may also be on the power line.

Referring to the lower left of FIG. 5, a pair of resistors R7 and R8 form a voltage divider to supply a V/2 reference for A1, A4 and A5.

The present invention is not limited to use with lightning strikes and can be adapted for use with electrical insults resulting for more mundane causes such as appliance shorts. Many fires are also caused when normal 60 Hz energy is inadvertently placed on Gas Appliance Connectors (GAC). Specifically, the electrical current damages the flared ends of these gas connectors, resulting in fire. The danger of 60 Hz ground faults to GACs and the propensity of these ground faults to cause fires is outlined in the paper "*Electrically Induces Gas Fires", Fire and Arson Investigator*, July 1999.

Figure 7:
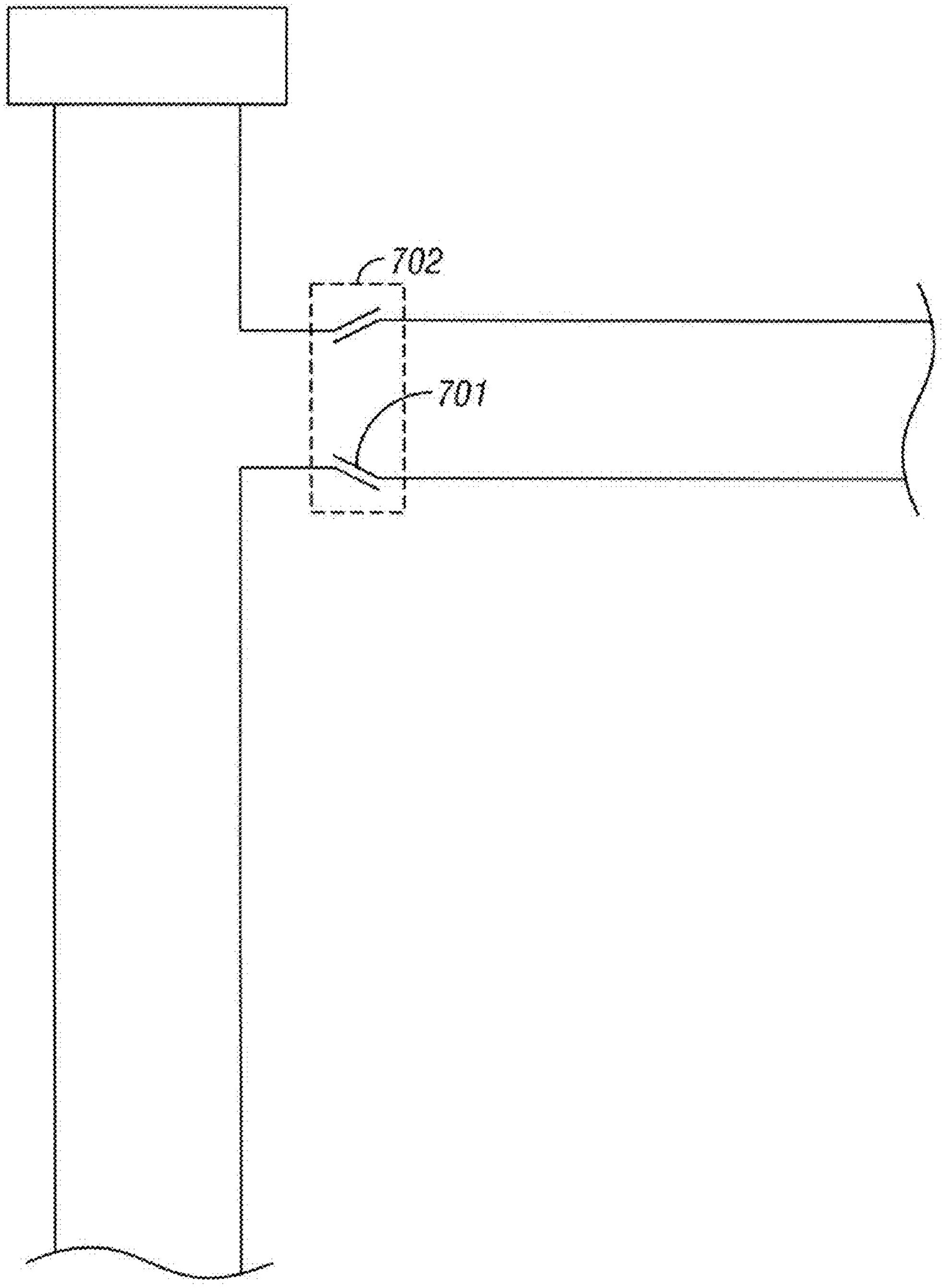
FIG. 7 shows a cross section view illustrating the physical interface between a Gas Appliance Connector and gas pipe.

FIG. 7 shows a cross section view illustrating the physical interface between a GAC and gas pipe. Flexible appliance connectors, as recognized by the Fuel Gas Code and other codes, make use of flared connections at their ends 701, along with the usual nut 702 (often brass) to make the connection secure. One means of failure of these types of connections is brought about when current from electric discharges is sent down the appliance connector in an attempt to reach ground potential. While the flared connections 701 are sufficient in terms of their ability to carry gas from a mechanical connection, the flared connection is subject to failure when required to carry electric current. The electric current often causes the flared connection to melt and arc, resulting in a gas leak and igniting the gas.

As with insult from lightning, currents will flow down the ground path. The signal can be inductively coupled, with 60 Hz being the frequency of interest. In this embodiment, the tuned circuit/amplifier will respond to ground currents in the 60 Hz region, corresponding to some type of ground fault. Alternatively, the signal can be directly coupled by a differential amplifier which derives its signal from the voltage drop along the ground wire. In either case, the 60 Hz ground fault will be sensed and the gas flow stopped in the manner describe above.

The circuit of the present invention can also be modified such that he front end tuned circuit is replaced by a Hall effect magnetic sensor, or by a direct contact means.

Figure 8:
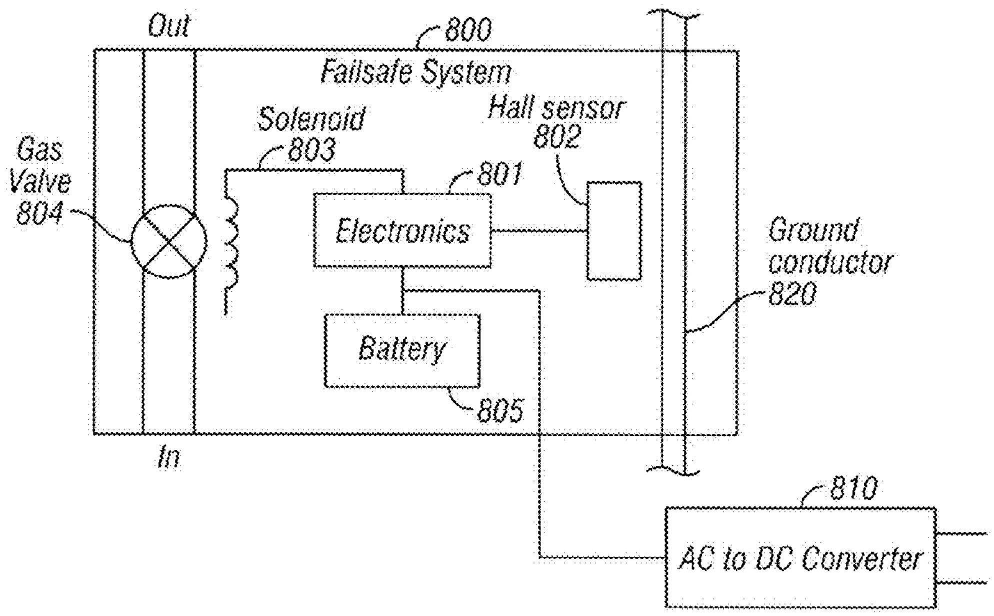
FIG. 8 shows an alternate embodiment of the present invention incorporating a Hall effect sensor.

FIG. 8 shows an alternate embodiment of the present invention incorporating a Hall effect sensor 802.

Figure 9:
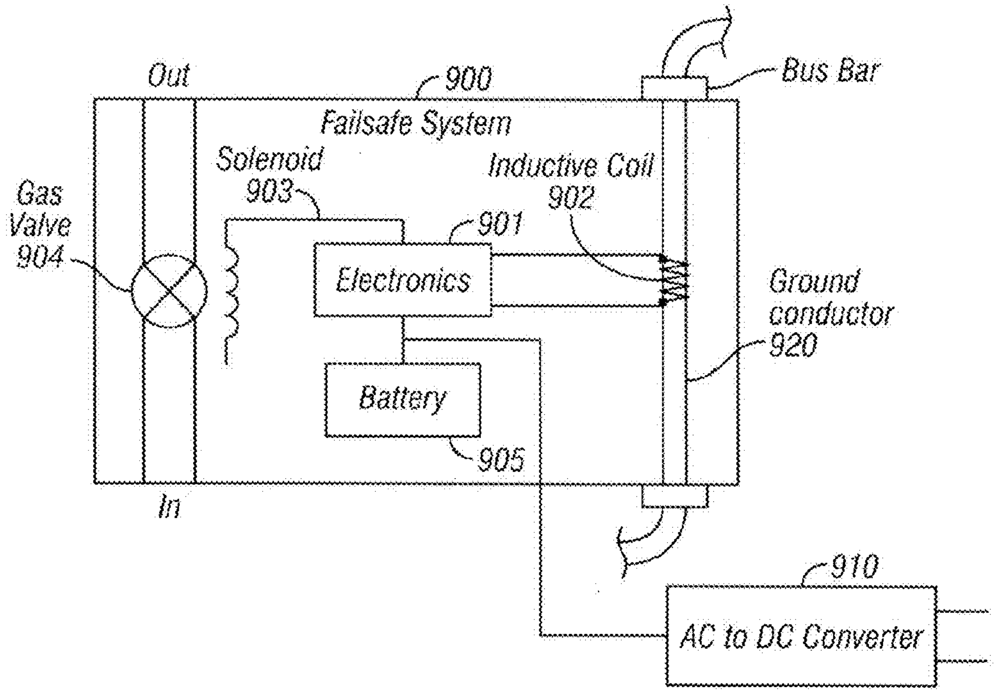
FIG. 9 shows an alternate embodiment of the present invention incorporating a direct contact inductive coil.

FIG. 9 shows an alternate embodiment of the present invention incorporating a direct contact inductive coil 902. In this design, the current flow from lightning creates voltage drop along the ground conductor 920. This current flow is sensed by a differential amplifier which has two inputs taken several inches apart on the ground wire 920 (usually #6 or greater copper). When a large current is present, as in the case of lightning or a 60 Hz ground fault, the voltage drop will be sensed and the remainder of the circuit 901, beginning at the window comparator, will accordingly stop the gas flow.

As stated briefly above, multiple sensors may be used to detect electrical surges along the ground conductor. These multiple sensors may be of a single type or different types. Therefore, the failsafe system of the present invention may use multiple tuned circuits, Hall effect sensors, or direct contact coils, or any combination thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. An apparatus for preventing electrically induced fires in gas tubing, comprising:

(a) a ground conductor that provides a ground path for gas tubing;

(b) at least one sensor inductively coupled to said ground conductor, wherein said sensor detects electrical surges along the ground conductor;

(c) control circuitry coupled to said sensor;

(d) a gas valve that controls gas flow through said gas tubing; and (e) a solenoid coupled to said control circuitry, wherein the solenoid forms part of said gas valve;

wherein the gas valve is kept in an open position by a continuous current from the control circuitry to the solenoid; and wherein in response to an electrical surge detected along the ground conductor, the control circuitry stops the current to the solenoid, causing the gas valve to close.

2. The apparatus according to claim 1, wherein the sensor in part (b) is a tuned circuit comprising an inductive loop and a capacitor.

3. The apparatus according to claim 2, wherein the tuned circuit further comprises a Metal Oxide Varistor (MOV) to protect the control circuitry in part (c) from high voltage transients.

4. The apparatus according to claim 2, wherein the tuned circuit is at resonance at approximately 300 KHz.

5. The apparatus according to claim 2, wherein the tuned circuit is at resonance at approximately 60 Hz.

6. The apparatus according to claim 1, wherein the sensor in part (b) is a Hall effect sensor.

7. The apparatus according to claim 1, wherein the sensor in part (b) is an inductive loop with two direct contacts to the ground conductor spaced apart to detect a voltage drop along the ground conductor produced by an electrical surge.

8. The apparatus according to claim 1, further comprising multiple sensors in part (b).

9. The apparatus according to claim 1, wherein the control circuitry in part (c) further comprises:

a tuned amplifier, wherein if an electrical surge is detected along the ground conductor, the sensor in part (b) drives the tuned amplifier to either zero volts or positive supply voltage, depending upon the polarity of the surge pulse;

a window comparator coupled to said tuned amplifier, wherein a signal from the tuned amplifier in response to an electrical surge produces an output signal drop toward zero volts from the window comparator; and a multivibrator timer coupled to said window comparator, wherein the multivibrator supplies a continuous pulse train to the solenoid in part (e), wherein an output signal drop from the window comparator removes power to the multivibrator.

10. The apparatus according to claim 9, further comprising a time constant circuit coupled between said window comparator and said multivibrator timer.

11. The apparatus according to claim 10, further comprising:

a first signal inverter coupled between the window comparator and the time constant circuit; and a second signal inverter coupled between the time constant circuit and the multivibrator timer.

12. The apparatus according to claim 1, further comprising an AC to DC converter that supplies power from a power line to the apparatus, wherein said converter is contained in a separate housing to isolate the operation of the gas valve from voltage spikes on the power line.

13. The apparatus according to claim 1, further comprising a battery that supplies power to the control circuitry in the event of a power outage.

14. The apparatus according to claim 1, wherein the electrical surge is produced by lightning.

15. The apparatus according to claim 1, wherein the electrical surge is produced by an electrical appliance short resulting in a ground fault.

16. The apparatus according to claim 1, wherein the gas tubing is Corrugated Stainless Steel Tubing (CSST).

17. The apparatus according to claim 1, wherein the gas tubing is Gas Appliance Connector (GAC).

* * * * *